(12) United States Patent
Winsor et al.

(10) Patent No.: US 12,546,990 B1
(45) Date of Patent: Feb. 10, 2026

(54) LIGHT-WEIGHT DIFFRACTIVE BEAM STEERING SYSTEM WITH HIGH EFFICIENCY AND BROAD FIELD OF REGARD

(71) Applicants: Beam Engineering for Advanced Measurements Co., Orlando, FL (US); Defense Advanced Research Projects Agency, Arlington, VA (US)

(72) Inventors: Robert Winsor, Hamilton, VA (US); David Roberts, Apopka, FL (US); Nelson Tabirian, Winter Park, FL (US); Aaron Becker, Altamonte Springs, FL (US)

(73) Assignees: Beam Engineering for Advanced Measurements Co., Orlando, FL (US); Defense Advanced Research Projects Agency (DARPA), Arlington, VA (US)

( * ) Notice: Subject to any disclaimer, the term of this patent is extended or adjusted under 35 U.S.C. 154(b) by 0 days.

(21) Appl. No.: 18/907,034

(22) Filed: Oct. 4, 2024

Related U.S. Application Data

(63) Continuation-in-part of application No. 18/217,853, filed on Jul. 3, 2023, now Pat. No. 12,111,557.

(51) Int. Cl.
*G02B 26/08* (2006.01)
*G02B 1/04* (2006.01)

(52) U.S. Cl.
CPC ........... *G02B 26/0808* (2013.01); *G02B 1/04* (2013.01); *G02B 26/0816* (2013.01)

(58) Field of Classification Search
CPC ...... G02B 26/08; G02B 26/0808–0816; G02F 1/29; G02F 1/292; G02F 1/133504; H01S 3/0071
See application file for complete search history.

(56) References Cited

U.S. PATENT DOCUMENTS

| | | |
|---|---|---|
| 9,557,456 B2 | 1/2017 | Tabirian et al. |
| 9,617,205 B2 | 4/2017 | Tabirian et al. |
| 9,658,512 B2 | 5/2017 | Tabirian et al. |
| 9,715,048 B2 | 7/2017 | Tabirian et al. |
| 9,983,479 B2 | 5/2018 | Tabirian et al. |
| 10,031,424 B2 | 7/2018 | Tabirian et al. |

(Continued)

FOREIGN PATENT DOCUMENTS

WO 2021037577 A1 3/2021

OTHER PUBLICATIONS

N. Tabiryan, D. Roberts, D. Steeves, and B. Kimball, "4G Optics: New Technology Extends Limits to the Extremes," Photonics Spectra, Mar. 2017, pp. 46-50, 5 pages.

(Continued)

*Primary Examiner* — Jonathan Y Jung
(74) *Attorney, Agent, or Firm* — Brian S. Steinberger; Hilary F. Steinberger; Steinberger IP Law

(57) ABSTRACT

Opto-mechanical assemblies, systems, devices and methods for pointing laser and other optical beam, and for directing the field of view of sensors are disclosed. The assemblies include means for rotating a cycloidal diffractive waveplate optic around a predetermined axis, and a reflective or transmissive optic that turns a diffracted optical beam onto a direction perpendicular to the rotation axis of the cycloidal diffractive waveplate, enabling a wide field of regard.

13 Claims, 13 Drawing Sheets

(56) References Cited

U.S. PATENT DOCUMENTS

| | | | |
|---|---|---|---|
| 10,036,886 B2 | 7/2018 | Tabirian et al. | |
| 10,423,045 B2 | 9/2019 | Roberts et al. | |
| 11,175,441 B1 | 11/2021 | Tabirian | |
| 11,294,240 B2 | 4/2022 | Tabirian | |
| 11,366,254 B2 | 6/2022 | Tabirian | |
| 2015/0276997 A1* | 10/2015 | Tabirian | G02B 5/1828 |
| | | | 359/573 |
| 2016/0033695 A1 | 2/2016 | Tabirian | |
| 2019/0302568 A1* | 10/2019 | Albelo | G02F 1/292 |
| 2020/0025986 A1 | 1/2020 | Tabirian | |
| 2020/0096689 A1 | 3/2020 | Tam | |
| 2022/0326565 A1* | 10/2022 | Saitoh | G02B 5/18 |
| 2023/0039081 A1* | 2/2023 | McManamon | G02F 1/29 |
| 2024/0151964 A1* | 5/2024 | Ziegler | G02B 27/0093 |

OTHER PUBLICATIONS

Tabirian, Nelson V. et al., Size, weight, and power breakthrough in non-mechanical beam and line-of-sight steering with geo-phase optics, Applied Optics, Sep. 1, 2021, vol. 60, No. 25, 8 pages.

Tabiryan, Nelson V. et al., Advances in Transparent Planar Optics: Enabling Large Aperture, Ultrathin Lenses, Advanced Optical Materials, 2021, 24 pages.

Tabirian, Nelson V. et al., Electrically switchable large, thin, and fast optics, OSA Imaging and Applied Optics, 2018, 2 pages.

Roberts, David E. et al., Switchable, broadband, polarization-independent diffractive optical components and systems, OSA Imaging and Applied Optics, 2018, 2 pages.

Roberts, David et al., Overcoming the tradeoff between efficiency and bandwidth for vector vortex waveplates, IEEE Aerospace Conference, 2019, 13 pages.

Roberts, David et al., Chromatic aberration corrected switchable optical systems, Liquid Crystals XXII, Proc. of SPIE, vol. 10735, 2018, 10 pages.

Roberts, D. et al., "Polarization-Independent Diffractive Waveplate Optics," Mar. 2018, IEEE Aerospace Conference, 11 pages.

De Sio, Luciano et al., "Beam shaping diffractive wave plates", Applied Optics, Jan. 1, 2018, vol. 57, No. 1, 4 pages.

Serak, S. V. et al. "High contrast, low voltage variable reflector for unpolarized light", Molecular Crystals and Liquid Crystals, 2017, 12 pages.

Ouskova, Elena et al., "Diffractive waveplates for long wave infrared", Proc. of SPIE, vol. 10194, 2017, 10 pages.

Vernon, J., et al., Recording Polarization Gratings with a Standing Spiral Wave, Applied Physics Letters, Oct. 2013, vol. 103, 4 pages.

Marshall, K. L. et al., "Liquid crystal near-IR laser beam shapers employing photo addressable alignment layers for high-peak-power applications", Liquid Crystals XVII, Proc. of SPIE, vol. 8828, 2013, 13 pages.

Serak, Svetlana V. et al., "All-optical diffractive/transmissive switch based on coupled cycloidal diffractive waveplates", Optics Express, vol. 20, No. 5, 2012, 10 pages.

Tabiryan, Nelson V. et al., "Transparent thin film polarizing and optical control systems", AIP Advances 1, 2011, 11 pages.

De Sio, Luciano et al., "Optically controlled holographic beam splitter", Applied Physics Letters, vol. 97, 2010, 3 pages.

Kimball, Brian R. et al., "Advances in Anisotropic Materials for Optical Switching", Proceedings of the 27th Army Science Conference, 2010, 8 pages.

Tabiryan, et al., The Promise of Diffractive Waveplates, OPN Optics and Photonics News, Mar. 2010, 6 pages.

Nersisyan, et al., Optical Axis Gratings in Liquid Crystals and Their Use for Polarization Insensitive Optical Switching, Journal of Nonlinear Optical Physics & Materials, vol. 18, No. 1, 2009, 47 pages.

Hrozhyk, Uladzimir et al., "Optical switching of liquid-crystal polarization gratings with nanosecond pulses", Optics Letters, vol. 34, No. 17, 2009, 3 pages.

Nersisyan, et al., Characterization of optically imprinted polarization gratings, Applied Optics, vol. 48, No. 21, Jul. 20, 2009, 6 pages.

Nersisyan, et al., Polarization insensitive imaging through polarization gratings, Optics Express, vol. 17, No. 3, Feb. 2, 2009, 14 pages.

Sarkissian, et al., Polarization-Controlled Switching Between Diffraction Orders in Transverse-Periodically Aligned Nematic Liquid Crystals, Optics Letters, Aug. 2006, abstract, 4 pages.

Serak, S., et al., High-efficiency 1.5 mm Thick Optical Axis Grating and its Use for Laser Beam Combining, Optical Society of America, vol. 32, No., Jan. 2007, 4 pages.

\* cited by examiner

LIGHT-WEIGHT DIFFRACTIVE BEAM STEERING SYSTEM WITH HIGH EFFICIENCY AND BROAD FIELD OF REGARD

CROSS-REFERENCE TO RELATED APPLICATIONS

This application is a Continuation-In-Part of U.S. patent application Ser. No. 18/217,853, filed Jul. 3, 2023, now allowed, which is incorporated by reference in its' entirety.

GOVERNMENT LICENSE RIGHTS

This invention was made with government support under Contract No. 140D0423C0091 awarded by the Defense Advanced Research Projects Agency. The government has certain rights in this invention.

FIELD OF THE INVENTION

This invention relates generally to the field of optics, and in particular to diffractive optical structures, devices, systems, methods, and processes which are used to steer a beam of electromagnetic radiation.

BACKGROUND OF THE INVENTION

Many modern technologies require steering of optical beams. The applications include LiDARs, optical communication, laser material processing, laser weapons, projection displays, etc. One of the methods of steering an optical beam is by means of a pair of wedge prisms whose rotational position can be varied, thereby varying the angle over which the optical beam is deflected. The refractive prisms comprising such pairs of wedge prisms are often referred to as Risley prisms. While Risley prisms are considered optimal in some applications, their use is not practical in other applications due to such factors as the weight of the prisms, the imbalance they introduce in the rotary apertures, and the availability of suitable refractive materials in the needed sizes to support the desired aperture dimensions. Additionally, the larger the weight, the more powerful motors are required for rotating the prism, and the need for a high torque compromises the beam steering speed. These problems become especially important as the aperture sizes increase. For a given optical material, operating wavelength or wavelength band, and for the given beam deflection angle, the weight and volume of each prism in a Risley prism pair increases as the cube of the aperture dimension. For example, in order to double the aperture diameter, the weight and volume of each of the prisms must increase by a factor of eight. This unfavorable scaling of weight and volume, as well as the problems of cost and availability of suitable optical materials with sufficient size, prevents the use of Risley prisms in applications requiring large aperture dimensions.

Risley prisms deflect electromagnetic radiation by refraction. It is well known in the art that a pair of transmissive diffraction gratings can also be used to deflect an optical beam. An optical component that changes the direction of propagation of an optical beam by diffracting it will be referred to herein as a diffractive beam deflector. By rotating each diffractive beam deflector independently, it is possible to steer an optical beam over an extended, contiguous area of regard, transmitting it through a pair of diffractive beam deflectors. The use of diffractive beam deflectors eliminates the unfavorable scaling of weight and volume with aperture size that is characteristic of refractive prims.

However, the diffraction efficiency of diffractive beam deflectors varies with the angle of incidence. This results in a dependence of the fraction of light deflected into the desired direction on the angle through which the optical beam is deflected. Beam deflection systems based on prior art, employing diffractive beam deflectors, all suffer from some dependence of the fraction of light diffracted into the desired direction on the angle through which the light is diffracted. It is highly desirable to maximize the fraction of light deflected by a system of diffractive beam deflectors into the desired direction.

Unlike alternative beam deflection methods such as gimballed mirrors, prior art beam deflection systems based on either Risley prisms or on diffractive beam deflectors may affect the cross-section profile of the optical beam. For example, if the optical beam at the input to the beam deflector has a circular cross section, the optical beam at the output from the beam deflector may form an elliptical cross section.

The ellipticity of the output beam typically will increase as the angle between the direction of propagation of the beam at the input to the beam deflector and the direction of propagation of the beam at the output from the beam deflector increases. While this change in the shape of the beam cross section is acceptable in many applications, it is undesirable for various reasons in some applications. These reasons include changes in optical power density (that is, optical power per unit area) and the increase in far-field angular divergence associated with the noted change in the shape of the beam cross section.

Additionally, the efficiency and even the deflection angle may depend on polarization state of the optical beam, a phenomenon that is strongly exhibited, particularly, for diffractive waveplates.

Thus, there is a need for optical beam steering systems that are thin and lightweight, have high optical efficiency over large deflection angles and for any desired polarization state, and do not significantly change the cross section of the optical beam as a result of deflection.

SUMMARY OF THE INVENTION

The first objective of the present invention is to provide large aperture optical beam steering systems, assemblies, devices and methods that are thin and lightweight, and that have high efficiency over the entire range of accessible beam deflection angles.

The second objective of the present invention is to provide high-efficiency, thin and lightweight large aperture beam steering systems, assemblies, devices and methods for differently polarized optical beams.

The third objective of the present invention is to provide thin and lightweight large aperture beam steering systems, assemblies, devices and methods that do not significantly change the cross section of the optical beams as a result of beam deflection.

The fourth objective of the present invention is to provide large aperture beam steering systems, assemblies, devices that can fit into aerodynamic enclosures without significant change in sizes.

Many of the exemplary applications have been described herein with terms such as "optical beams" and "light" being used to describe electromagnetic radiation that is acted upon by the disclosed diffractive structures. The terms "optical beams" and "light" in this context should not be taken to restrict the scope of the disclosed embodiments to only those in which the electromagnetic radiation acted upon or manipulated by the diffractive structures is in the visible region of the spectrum.

As will be evident to those skilled in the art, the exemplary embodiments disclosed here, in addition to being applicable in the visible region of the spectrum, are equally applicable to the microwave, infrared, ultraviolet, and X-ray regions of the spectrum.

Further objectives and advantages of this invention will be apparent from the following detailed description of the presently preferred embodiments which are illustrated schematically in the accompanying drawings.

DETAILED DESCRIPTION OF THE INVENTION

Figure 1A:
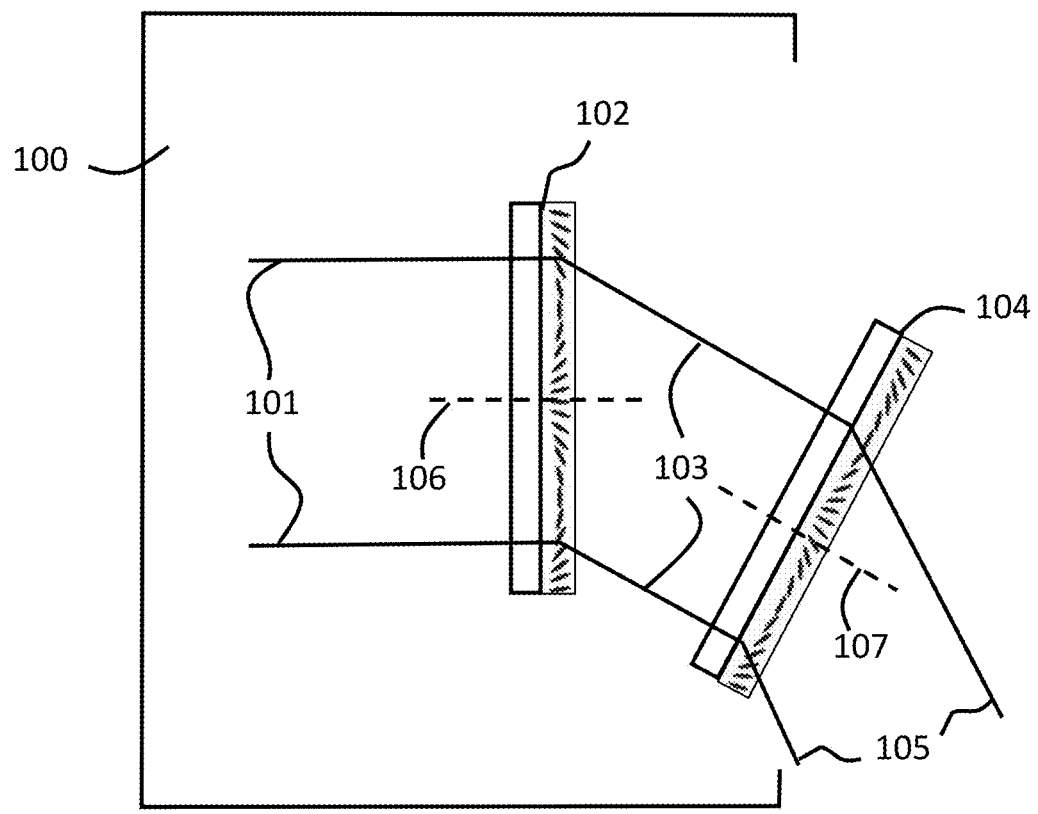
FIGS. 1A and 1B show a prior art diffractive beam steering system, which deflects an optical beam into a direction of propagation that depends on the angular position of each of two rotating diffractive beam deflectors.

Before explaining the disclosed embodiments of the present invention, it is to be understood that the invention is not limited in its applications to the details of the particular arrangements shown since the invention is capable of other embodiments. Also, the terminology used herein is for the purpose of description and not of limitation.

In the Summary of the Invention above and in the accompanying drawings, reference is made to particular features of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described in more detail with reference to the accompanying drawings, in which preferred embodiments of the invention are shown. This invention can, however, be embodied in many different forms and should not be construed as limited to the embodiments set forth herein. Rather, these embodiments are provided so that this disclosure will be thorough and complete, and will convey the scope of the invention to those skilled in the art. Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Rotating CDWs for steering laser beams or field of view of sensors have been described in U.S. Pat. Nos. 10,036,886, 9,715,048, and 9,557,456, to Tabirian et al., which are all assigned to one of the assignees as the subject patent application, and which are all incorporated by reference in their entirety.

Structures based on diffractive waveplate technology, which act on light independent of the polarization of the light, are described in U.S. Pat. No. 11,175,441 to Tabirian et al., which is assigned to one of the assignees as the subject patent application, and which is incorporated by reference in its entirety.

Diffractive beam deflectors would require enclosures to house and support the large aperture diffractive beam deflector system. Size and weight and the enclosures would need to be minimized for some applications without reducing aperture size or the range of angles for the diffractive beam deflector operation. Some applications would also impose other limitations requiring, for example, aerodynamically shaped enclosures. The enclosure sizes of the diffractive beam deflectors of prior art as described in U.S. patent application Ser. No. 18/217,853 by Winsor et al., are considerably larger than the optical aperture.

Laser beams of large aperture sizes used, particularly, for optical communication and material processing applications, are often steered with the aid of gimbals that rotate a mirror or a systems of mirrors over wide range of angles, typically, 360 degrees in azimuth, and 180 degrees in elevation. These gimbals are thus large and heavy, and can be used mostly in stationary platforms.

The need for fitting large aperture beam steering systems on airborne platforms is becoming more and more important due to the advent of power beaming technologies, as summarized, for example, in a recent DARPA press release "Persistent Optical Wireless Energy Relay (POWER)," https://www.darpa.mil/program/power) and the publication of the first monograph on the subject by Paul Jaffe et al. "Power Beaming: History, Theory, And Practice (World Scientific Series on Emerging Technologies: Avram Bar-Cohen Memorial Series, 2024).

In prior art, U.S. patent application Ser. No. 18/217,853, Winsor et al. disclosed Risley beam steering system wherein the Risley pair of prisms had been replaced by thin diffractive films-cycloidal diffractive waveplates (CDWs). However, CDWs, like other diffraction gratings, have a limited steering angle range for high efficiency. Additionally, having two prisms or two CDWs mounted on two different rotary actuators increases the weight of the beam steering system and optical losses caused by reflections, absorption, scatter and deviations of diffraction efficiency of individual components from 100%.

To enhance the range of steering angles maintaining high efficiency, Winsor et al. in U.S. patent application Ser. No. 18/217,853 disclosed an articulated beam steering system that utilized CDWs mounted on rotary actuators in complex our configurations as demonstrated as an example in FIG. 1 wherein 102 and 104 are the two diffractive beam deflectors (DBDs) comprising CDWs mounted on rotary actuators. The incident light beam 101 is diffracted by the DBD 102 such as the diffracted beam 103 is incident on the DBD 104 that is tilted with respect to DBD 102 to make the angle of incidence of the beam 103 optimum for achieving high efficiency diffraction by the DBD 104.

Figure 1B:
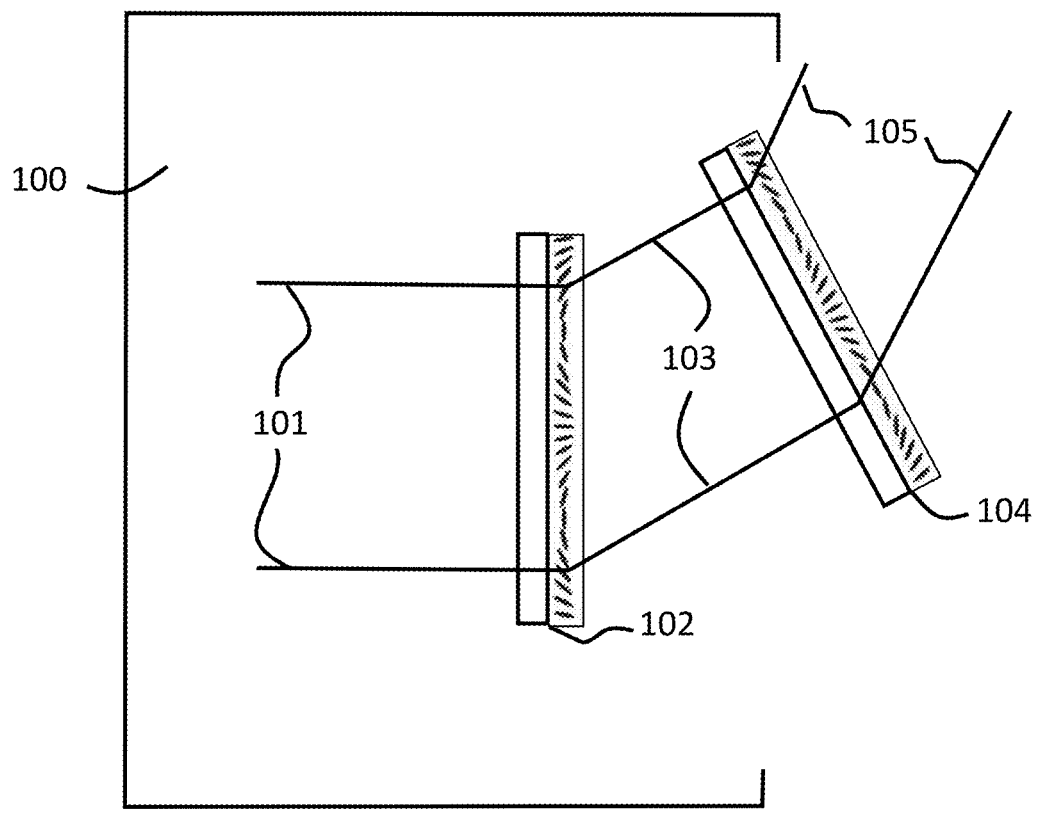

The DBD 104 is affixed onto the DBD 102 such that the angle between rotation axis 106 of the DBD 102 and the rotation axis 107 of the DBD 104 corresponds to the optimum angle of incidence of the diffracted beam 103 on the DBD 104 for all rotation angles of the DBD 102. FIG. 1A and FIG. 1B show schematically the cases wherein DBD 102 is rotated by 180 degrees thus rotating the DBD 104 to the new position. The beam 105 diffracted by the DBD 104 is propagating down in FIG. 1A and propagating up in FIG. 1B for demonstration purposes.

The need for articulation requires the enclosure 100 in FIG. 1 of the beam steering system to have considerably larger sizes compared to the aperture sizes of the diffractive beam deflectors (DBDs) 102 and 104 in FIG. 1.

Figure 2:
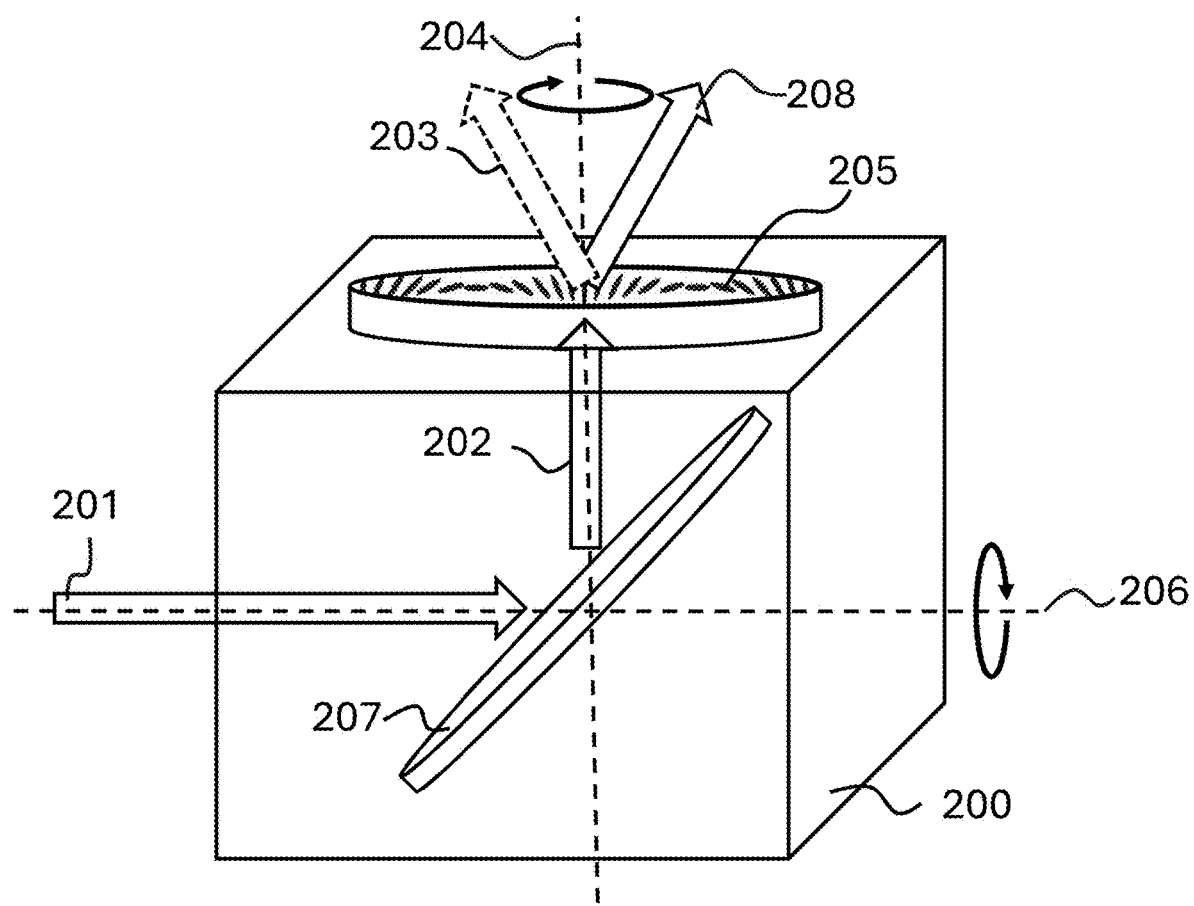
FIG. 2 shows the diffractive beam deflector assembly with a reflective optics in case the rotation axis of the diffractive beam deflector and the assembly are perpendicular to each other.

In preferred embodiment of current invention shown in FIG. 2, high efficiency diffraction over broad range of angles is obtained a) with a single CDW only, and b) without compromising the sizes and aerodynamic properties of the system for large aperture optics. Namely, the DBD 205 in the preferred embodiment of current invention is furnished with a reflective optics 207, and such DBD assembly 200 can be brought into rotary motion along the axis 206 that is perpendicular to the rotation axis 204 of the DBD 205.

In FIG. 2, a light beam 201 propagating along the rotation axis 206 is reflected by the reflective optics 207. The reflected beam 207 is deflected by the DBD 205 on an angle depending on rotational position of the DBD 205. FIG. 2 shows the deflected beams 203 and 208 in two positions corresponding to 180 degrees rotation of the DBD 205 around the axis 204.

Figure 3A:
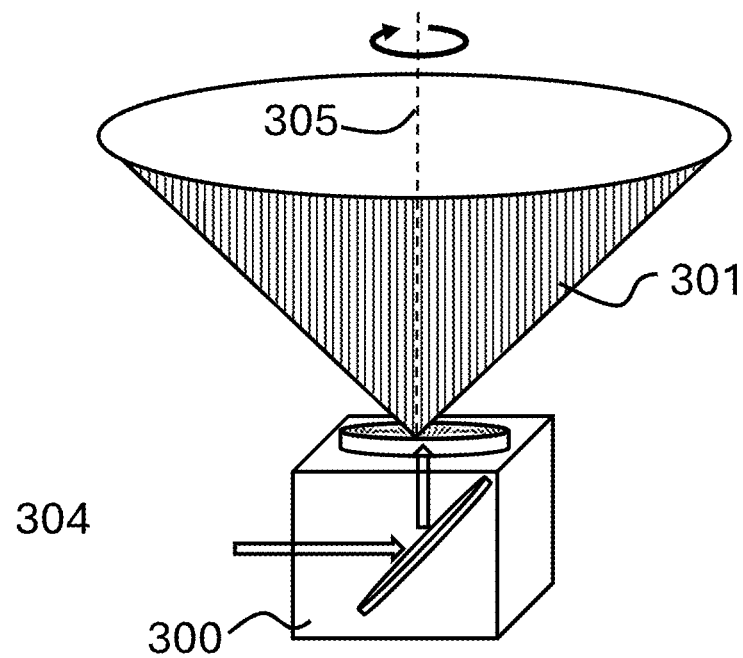
FIGS. 3A and 3B show beam steering cones for different rotational arrangements of the diffractive beam deflector and the assembly with reflective optics.
Figure 3B:
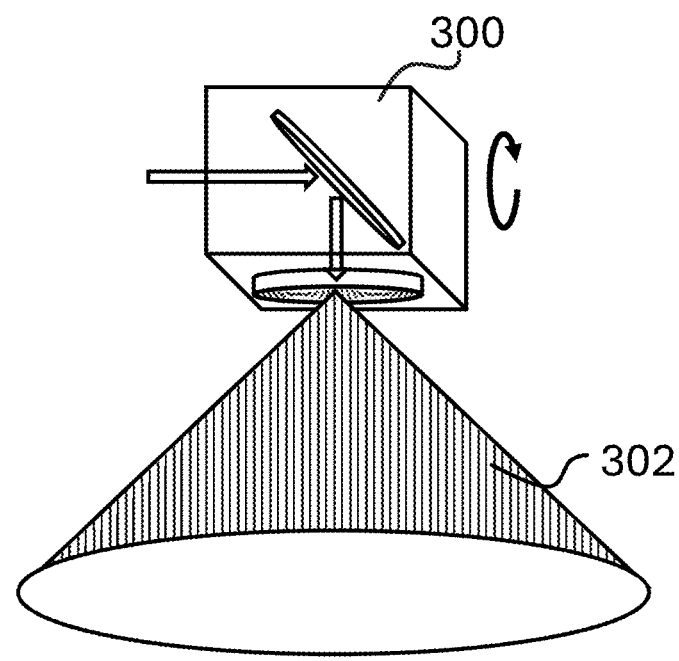
Figure 3C:
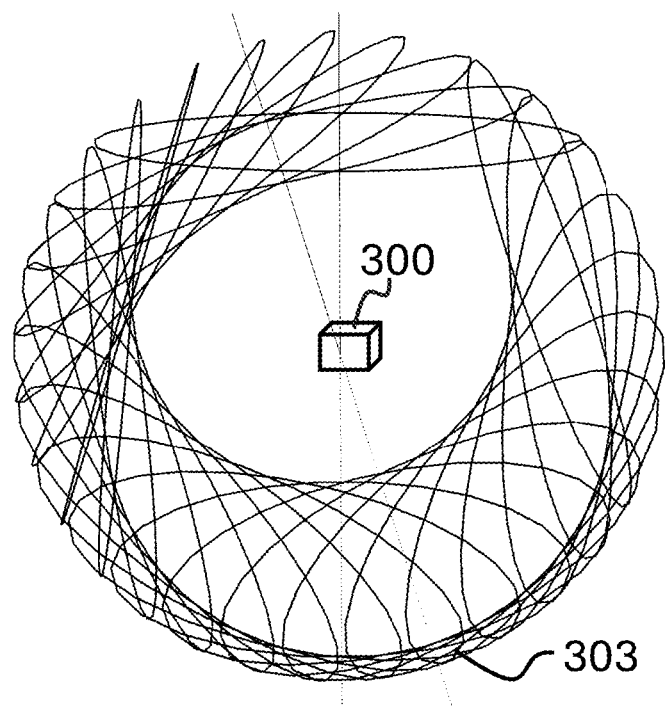
FIG. 3C shows the overlap of beam steering cones for different rotational arrangements of the diffractive beam deflector and the assembly.

Rotation of the DBD 205 around its axis 204 allows deflection of the beam 201 incident on the DBD assembly 200 around a cone. This is shown in FIG. 3 for different angular positions of the DBD assembly 300. The con is pointing up in FIG. 3A and down in FIG. 3B corresponding to 180 degrees rotation of the DBD assembly 300. As demonstrated in FIG. 3C, an arbitrary point in 3D space within maximum diffraction angles thus can be obtained by rotating the DBD and reflective optics assembly 300 around the axis 304 corresponding to the incident beam propagation direction, and by rotating the DBD in the assembly around the axis 305 perpendicular to the assembly axis 304. The circles 303 around the DBD assembly 300 demonstrate the range of accessible beam steering angles limited by the maximum of the high efficiency diffraction angles.

Figure 4:
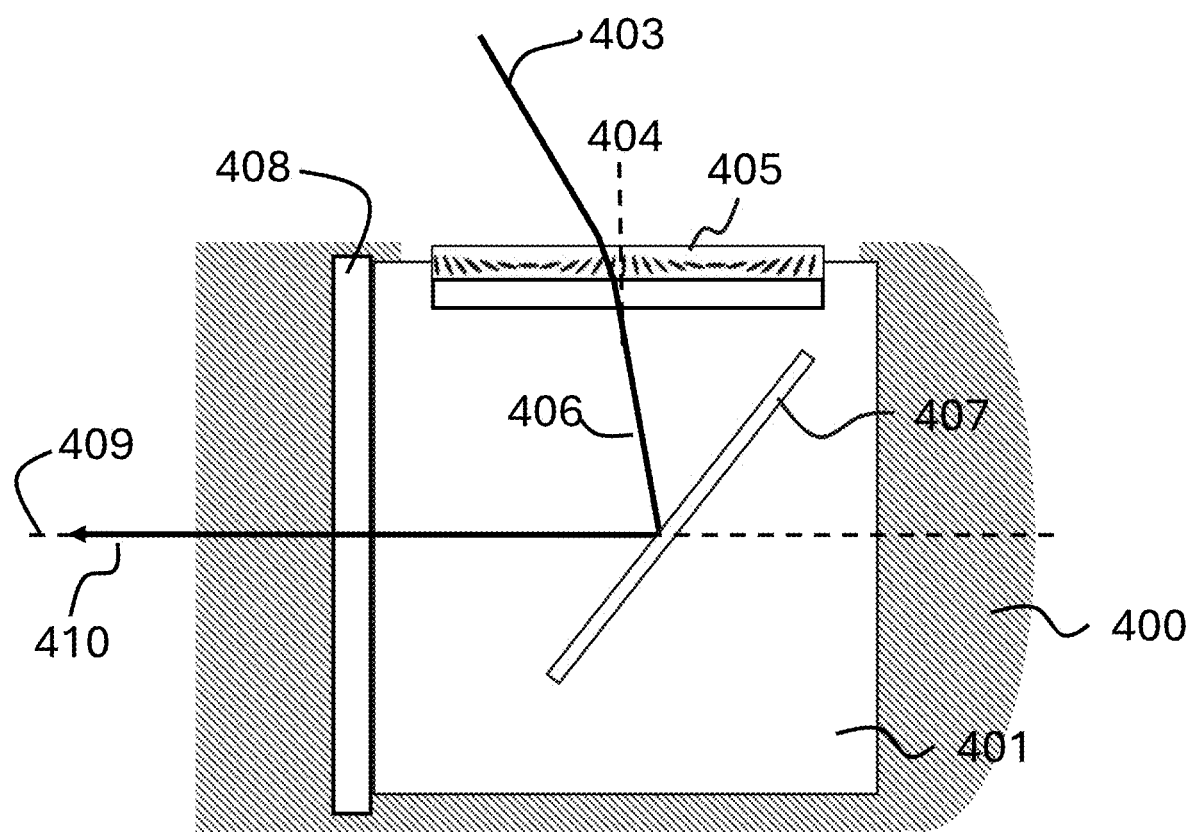
FIG. 4 shows the diffractive beam deflector in aerodynamic shroud.

FIG. 4 shows schematically an embodiment of the beam steering system of the current invention wrapped into an aerodynamic shroud 400. The incident beam 403 is deflected by the DBD 405 onto the reflective optics 407 that directs the deflected beam 406 along the rotation axis 409 of the DBD and reflective optics assembly 401. The rotation axis 409 is perpendicular to the rotation axis 404 of the DBD 405. FIG. 4 also shows schematically the rotary actuator 408 that rotates the DBD and mirror assembly 401 around the axis 409.

Figure 5:
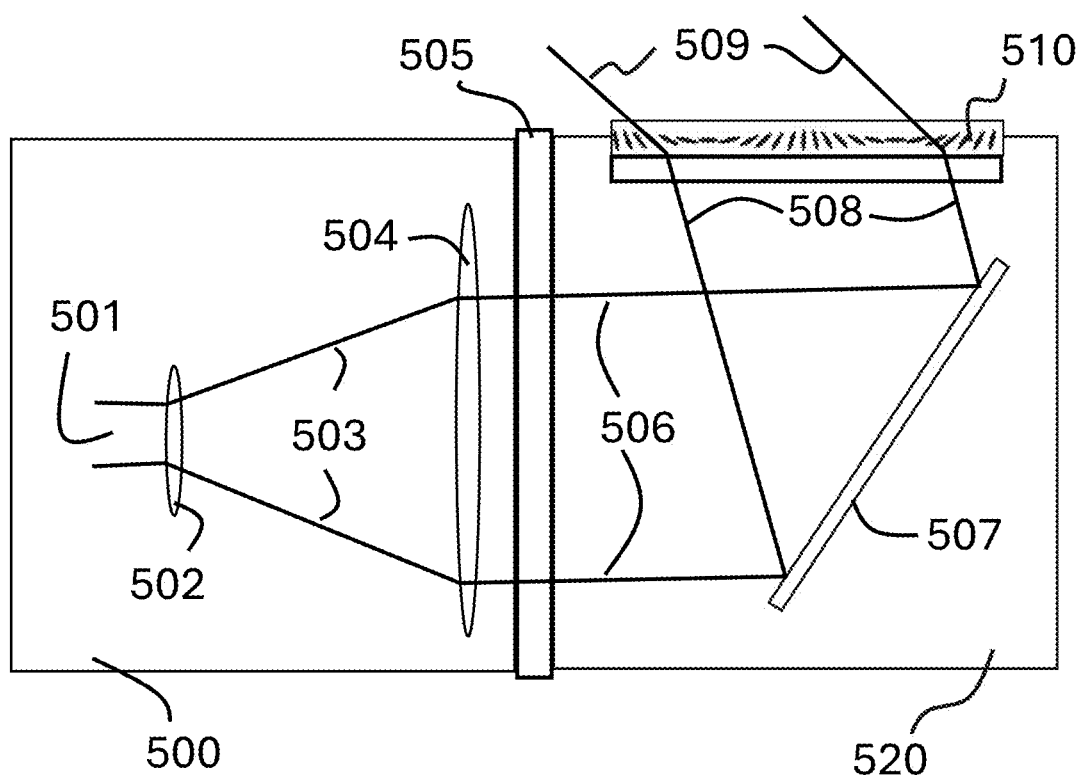
FIG. 5 shows the diffractive beam deflector assembly with a stationary optical system for controlling the beam.

FIG. 5 shows a stationary opto-mechanical assembly 500 used for further processing of the beam 506 reflected by the reflective optics 507. As an example, the stationary opto-mechanical assembly may possess a system of lenses for changing beam size. In this example, the incident beam 509 is deflected by the DBD 510 on the reflective optics 507 that redirects the deflected beam 508 onto the stationary platform 500 housing a system of lenses 502 and 504 designed to reduce the beam 506 reflected by the reflective optics 507 to a desired size 501.

Figure 6:
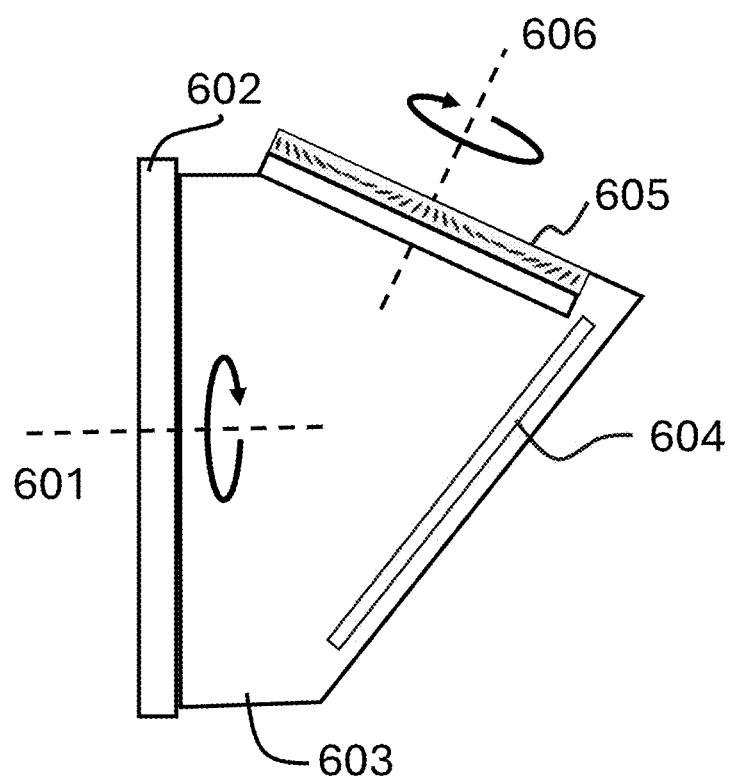
FIG. 6 shows the diffractive beam deflector with its rotation axis making a near 45 degrees angle with respect to rotation axis of the assembly.

The mutual alignment of the rotation axes of the DBD and the reflective optics assembly 603 may be varied from normal in another preferred embodiment shown in FIG. 6. In the preferred embodiment, the angle between rotation axis 606 of DBD 605 makes about 45 degrees angle with respect to the rotation axis 601. Such arrangements may improve aerodynamic properties of the beam steering assembly. FIG. 6 also shows the rotary actuator 602 that rotates the DBD and reflective optics assembly 603 around the axis 601.

Figure 7:
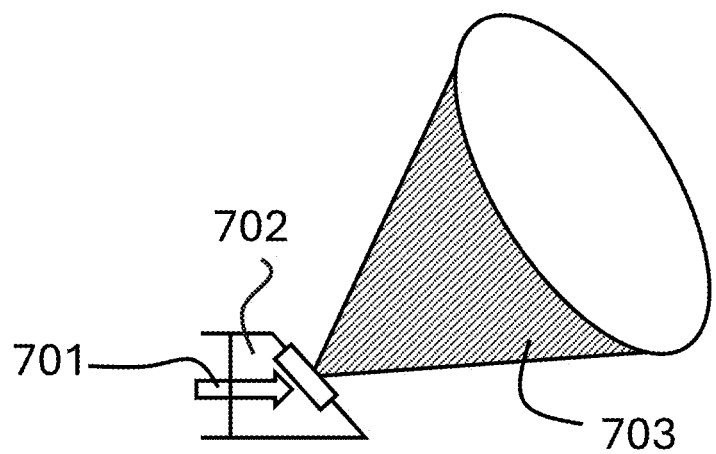
FIG. 7 shows a beam steering cones for opposite orientations of the diffractive beam deflector assembly.
Figure 7:
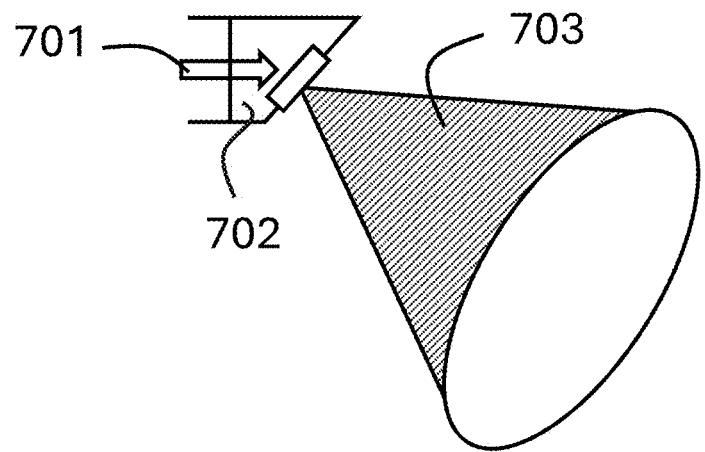

The angle between the axes 601 and 606 could be chosen to obtain a desired field of regard. FIG. 7 demonstrates the cone 703 of the steering angles for 180 degrees rotation of the assembly 702 for an incident light beam 701.

The reflective optics discussed above, in FIG. 2 to FIG. 7, can be a metal coated mirror, a dielectric mirror, or a Bragg mirror. In preferred embodiment, the reflective optics is a thin film of chiral bandgap liquid crystal Bragg structure adding more functionality to the system such as polarization and wavelength selectivity. Such reflective structures are described, for example, by Ouskova, et al. High efficiency, lossless, large free-standing photonic bandgap polymer films, Liquid Crystals, 50, 130-139, 2022. The reflective optics in preferred embodiments may also be deformable for wavefront correction purposes.

Figure 8:
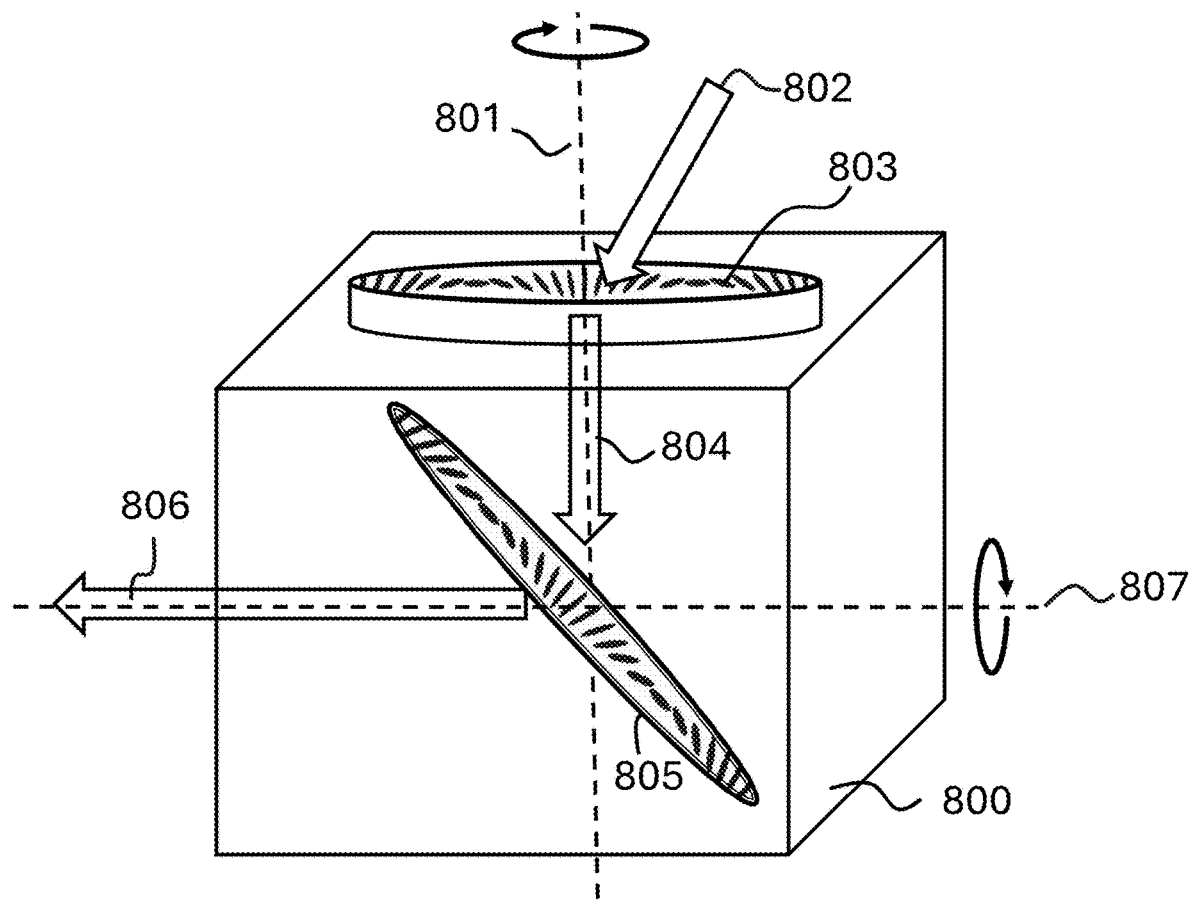
FIG. 8 shows the diffractive beam deflector assembly comprising a transmissive optics.

To reduce alignment sensitivity of beam control systems that utilize reflective optics, the beam steering assembly may incorporate a transmissive beam deflector optics, a CDW 805 in the preferred embodiment shown in FIG. 8, replacing the reflective optics in other embodiments. In FIG. 8, the beam 802 incident on DBD 803, and the beam 804 deflected by the DBD 803 onto the CDW 805 that further deflects the beam along the axis 807 of DBD and CDW assembly 800. The beam 806 obtained as a result of deflection by the CDW 805 may further be processed on its propagation path by additional optical components and systems for controlling size, shape, polarization and wavefront.

Figure 9A:
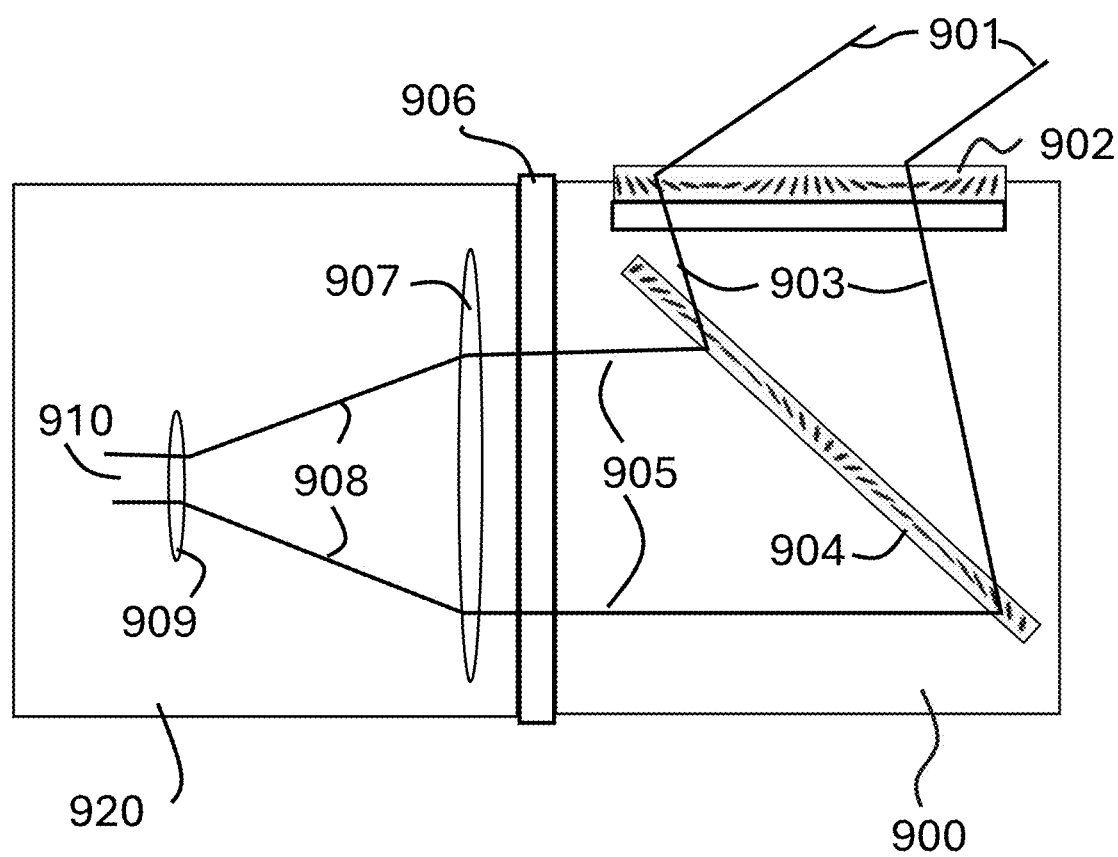
FIG. 9A shows the diffractive beam deflector assembly comprising a transmissive optics further comprising stationary optical systems for controlling the beam.
Figure 9B:
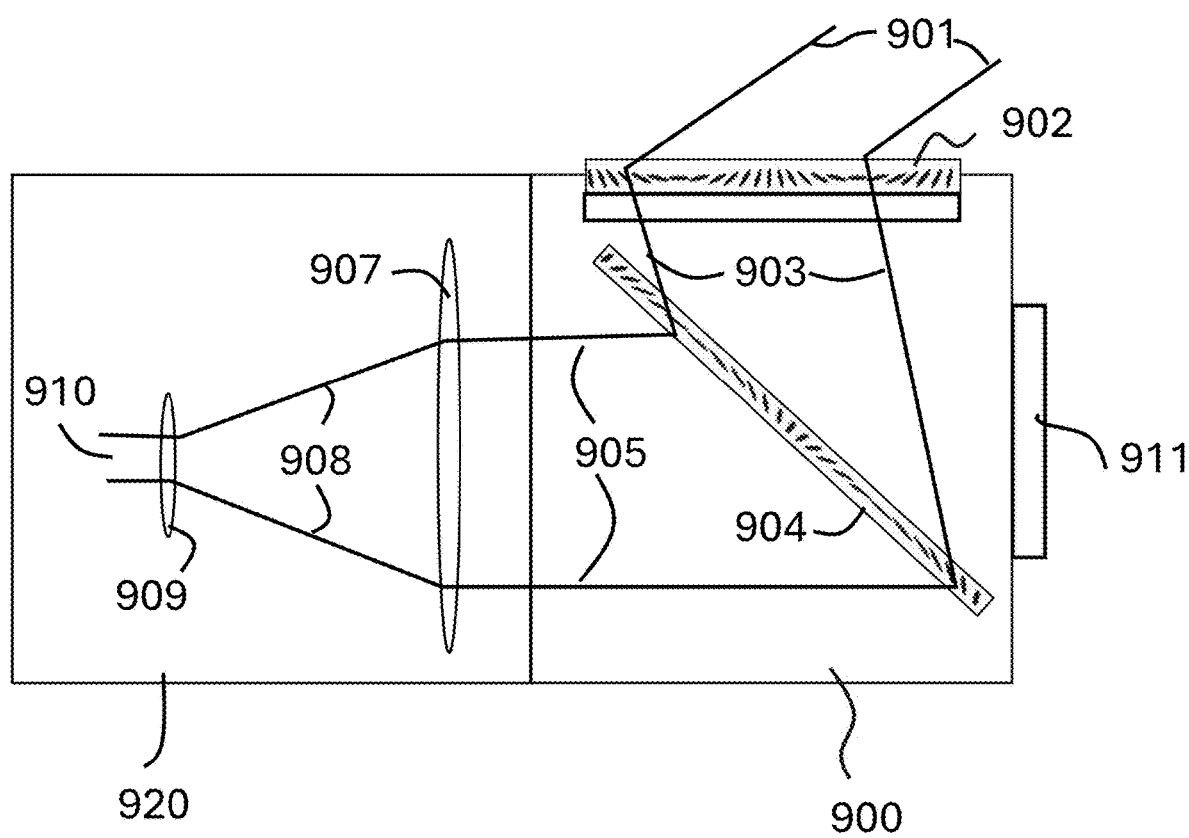
FIG. 9B shows the diffractive beam deflector assembly with a motor to rotate it without obscuring the beam.

Beam reducing system of lenses is shown as an example in FIG. 9A and FIG. 9B wherein: 901 is the beam incident on the DBD 902; the beam 903 is obtained by deflection of the incident beam 901 by the DBD 902; the CDW 904 deflects the beam 903, and the deflected beam 905 propagating through the rotary actuator 906 is recollimated by lenses 907 and 909 into the beams 908 and 910. The rotary actuator 906 can be replaced with a motor 911 to rotate the DBD and CDW assembly 900 without being on the path of the beam.

Figure 10:
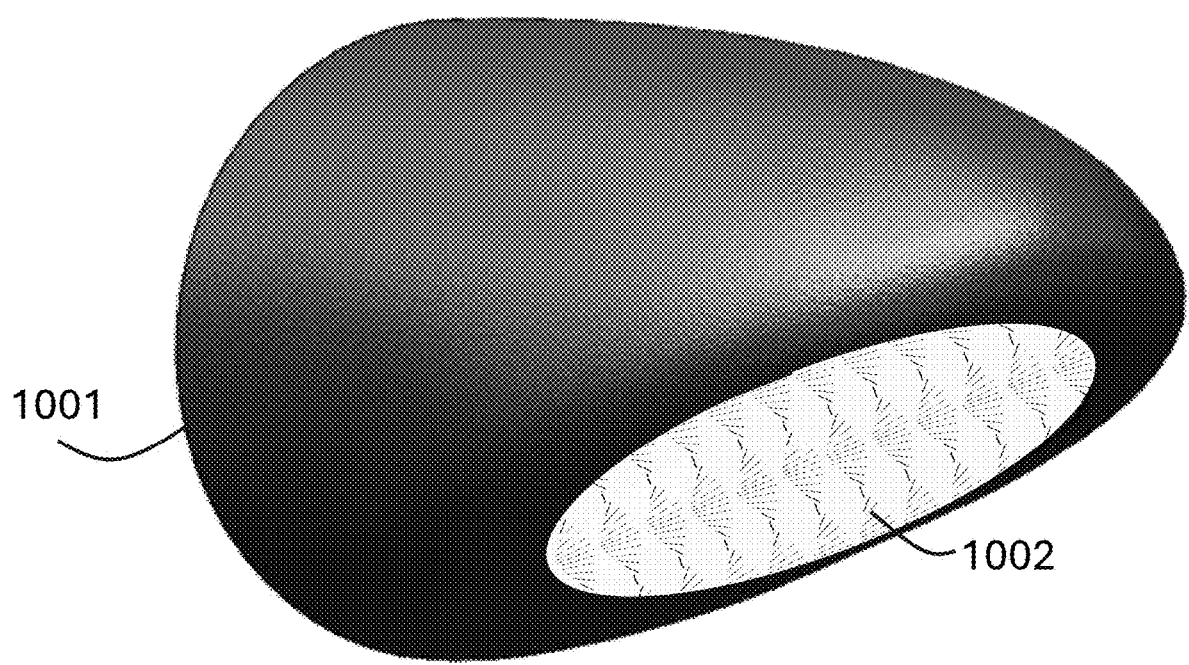
FIG. 10 shows the diffractive beam deflector assembly mounted into an aerodynamic shroud.

An example of aerodynamically shaped DBD assembly of current invention is shown in in FIG. 10 where in 1001 is the aerodynamic shroud and 1002 is the CDW in DBD assembly.

Modifications, additions, or omissions may be made to the systems, apparatuses, and methods described. Although specific advantages have been discussed above, various embodiments may include some, none, or all of the enumerated advantages.

The term "approximately"/"approximate" can be +/−10% of the amount referenced. Additionally, preferred amounts and ranges can include the amounts and ranges referenced without the prefix of being approximately.

Modifications, additions, or omissions may be made to the systems, apparatuses, and methods described herein without departing from the scope of the disclosure. For example, the components of the systems and apparatuses can be integrated or separated. Moreover, the operations of the systems and apparatuses disclosed herein can be performed by more, fewer, or other components and the methods described can include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A light-weight large aperture diffractive beam steering system of wide field of regard comprising:
    an optical beam;
    a diffractive beam deflector comprising at least one cycloidal diffractive waveplate and means for rotating the cycloidal diffractive waveplate around a predetermined axis;
    a reflective optics assembly directing the optical beam diffracted by the cycloidal diffractive waveplate onto a direction that is perpendicular to the rotation axis of the cycloidal diffractive waveplate; and
    a rotary actuator rotating the diffractive beam deflector and the reflective optics assembly around an axis perpendicular to the rotation axis of the cycloidal diffractive waveplate.

2. The diffractive beam steering system as in claim 1 wherein the cycloidal diffractive waveplate comprises one of: a liquid crystal; a liquid crystalline polymer; and a combination of thereof.

3. The diffractive beam steering system of claim 1, wherein the rotation axis of the cycloidal diffractive waveplate makes an angle with respect to the rotation axis of cycloidal diffractive waveplate and reflective optics assembly.

4. The diffractive beam steering system of claim 1, wherein the reflective optics comprises one of: a flat mirror, a concave mirror, a deformable mirror; reflective bandgap films; cholesteric liquid crystal polymer.

5. The diffractive beam steering system of claim 4, further comprising an optical system for controlling propagation of the optical beam, the system including one or a combination of: lenses; mirrors; adaptive optics; spatial light modulators; apertures; wavefront sensors; cameras; photovoltaic cells; filters, prisms.

6. The diffractive beam steering system of claim 1 fitted within aerodynamic enclosures.

7. A light-weight large aperture diffractive beam steering system of wide field of regard comprising:
    an optical beam;
    a diffractive beam deflector comprising at least one cycloidal diffractive waveplate,
    means for rotating the cycloidal diffractive waveplate around a predetermined axis;
    a transmissive optics assembly directing the optical beam diffracted by the cycloidal diffractive waveplate onto a direction that is perpendicular to the rotation axis of the cycloidal diffractive waveplate; and
    a rotary actuator rotating the diffractive beam deflector and the transmissive optics assembly around an axis perpendicular to the rotation axis of the cycloidal diffractive waveplate.

8. The diffractive beam steering system as in claim 7, wherein the cycloidal diffractive waveplate comprises one of: a liquid crystal; liquid crystalline polymer; a combination of thereof.

9. The diffractive beam steering system of claim 8, wherein the rotation axis of the cycloidal diffractive waveplate makes an angle with respect to the rotation axis of cycloidal diffractive waveplate and transmissive optics assembly.

10. The diffractive beam steering system of claim 7, wherein the transmissive optics in the diffractive beam deflector assembly comprises one or a combination of: a cycloidal diffractive waveplate; a lens; a lens with off-axis parabolic profile; a prism; a cycloidal diffractive waveplate having optical power.

11. The diffractive beam steering system of claim 7, wherein the rotation axis of the cycloidal diffractive waveplate makes an angle with respect to the rotation axis of the cycloidal diffractive waveplate and the transmissive optics assembly.

12. The diffractive beam steering system of claim 7, further comprising an optical system for controlling propagation of the optical beam, the system including one or a combination of: lenses; mirrors; adaptive optics; spatial light modulators; apertures; wavefront sensors; cameras; photovoltaic cells; filters, prisms.

13. The diffractive beam steering system of claim 7 fitted within aerodynamic enclosures.

* * * * *